Nov. 12, 1940.    L. G. WHEELER    2,221,279
MULTIPLE-BORING MACHINE
Filed Dec. 8, 1938    4 Sheets-Sheet 1
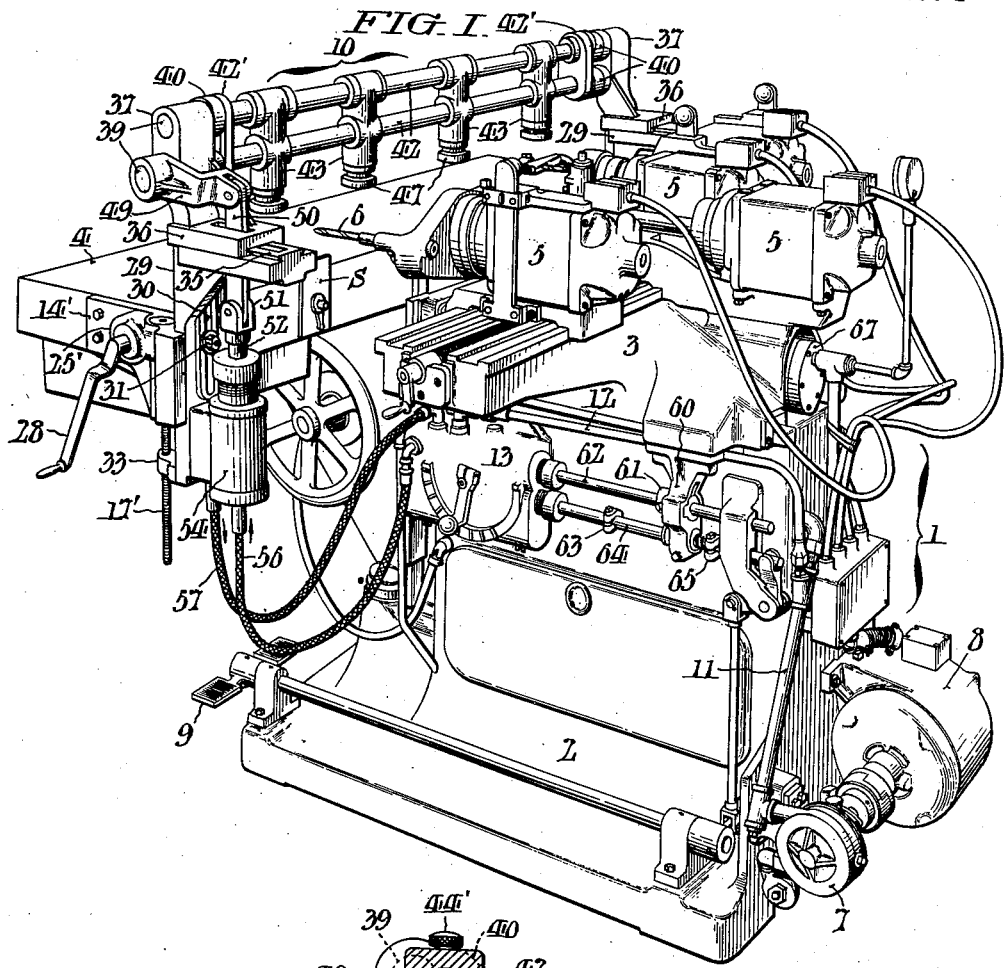
FIG. I.
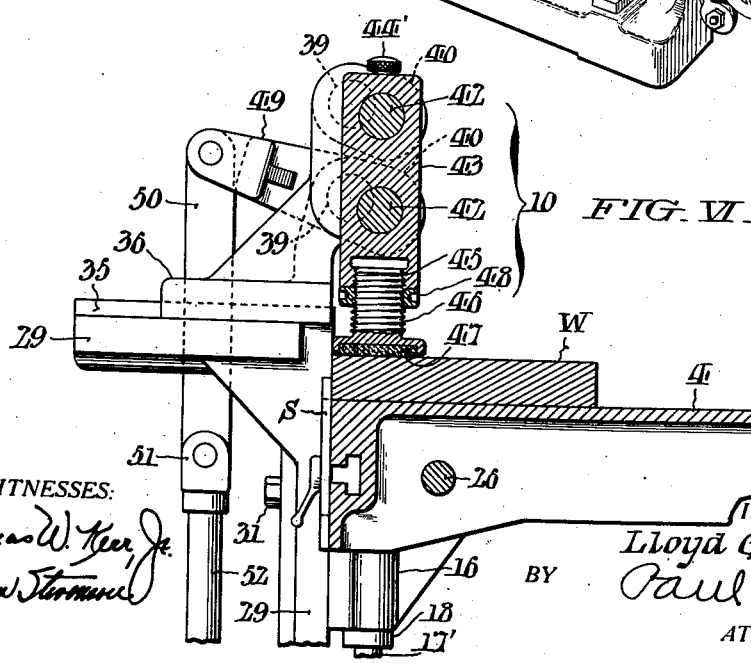
FIG. VI.
WITNESSES:
INVENTOR:
Lloyd G. Wheeler,
BY
ATTORNEYS.

Nov. 12, 1940.   L. G. WHEELER   2,221,279
MULTIPLE-BORING MACHINE
Filed Dec. 8, 1938   4 Sheets-Sheet 2
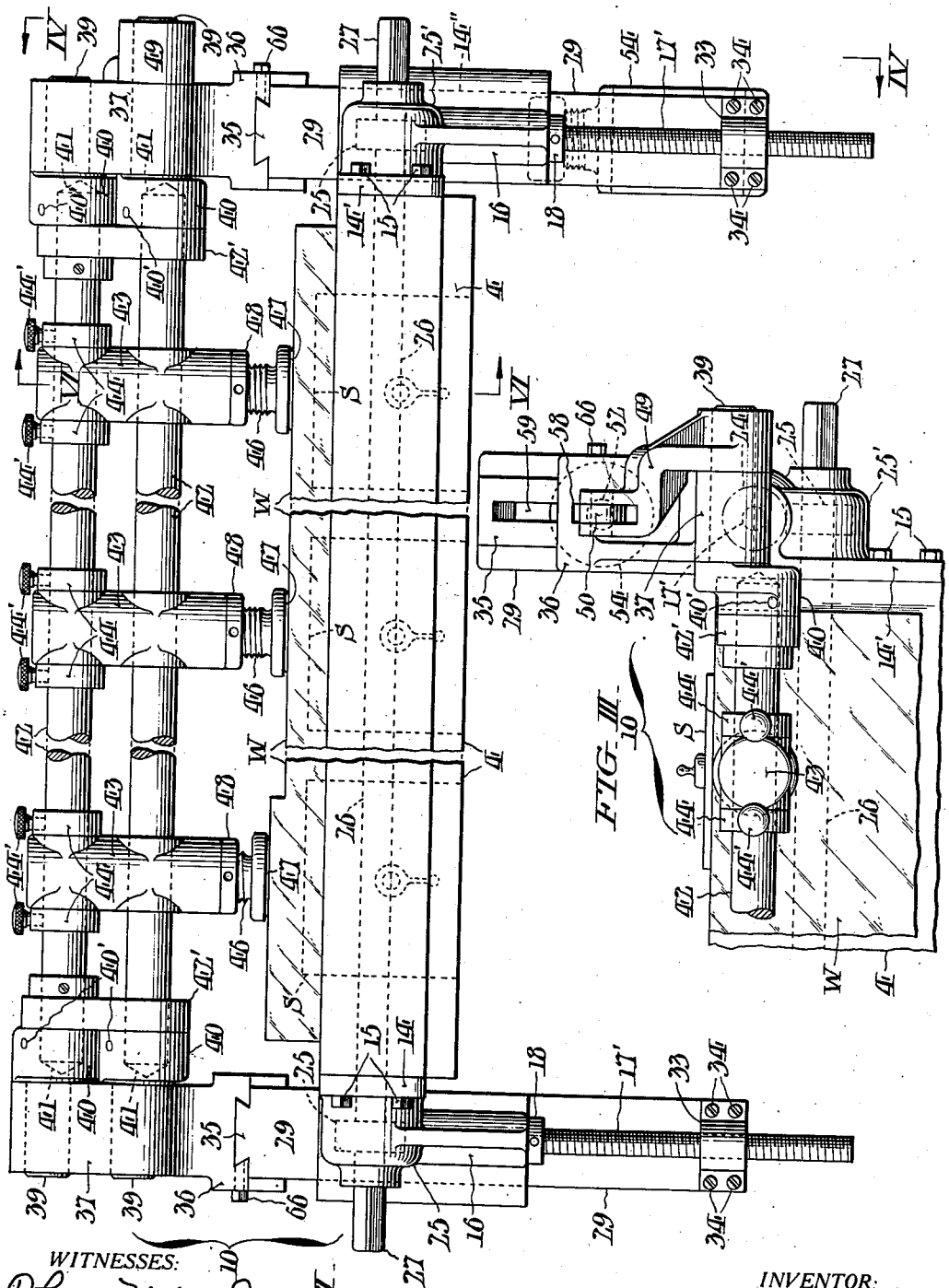
INVENTOR:
Lloyd G. Wheeler,
BY Paul & Paul
ATTORNEYS.

Nov. 12, 1940. L. G. WHEELER 2,221,279
MULTIPLE-BORING MACHINE
Filed Dec. 8, 1938 4 Sheets-Sheet 3
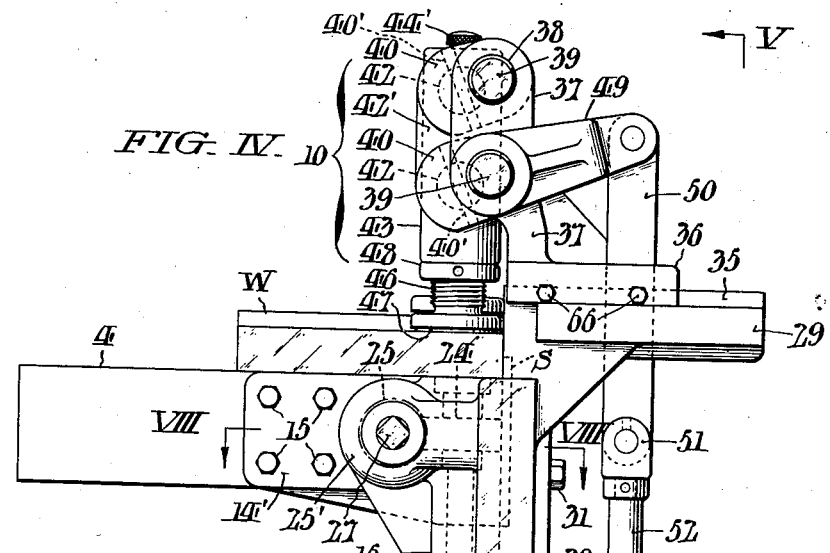
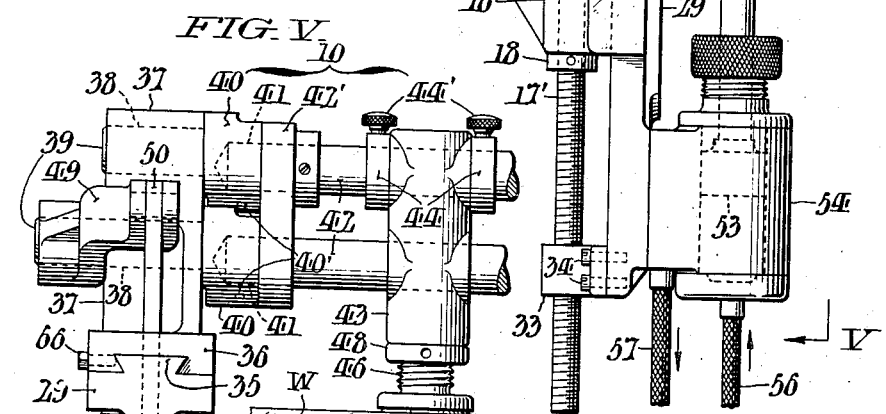
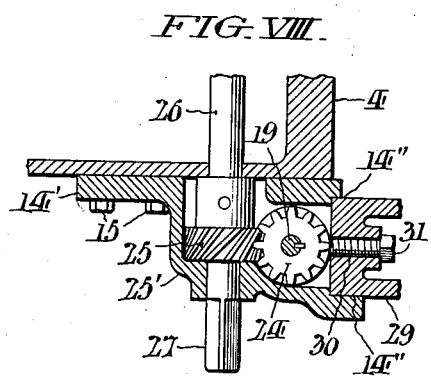
INVENTOR:
Lloyd G. Wheeler,
BY Paul & Paul
ATTORNEYS.

Nov. 12, 1940.  L. G. WHEELER  2,221,279
MULTIPLE-BORING MACHINE
Filed Dec. 8, 1938  4 Sheets-Sheet 4
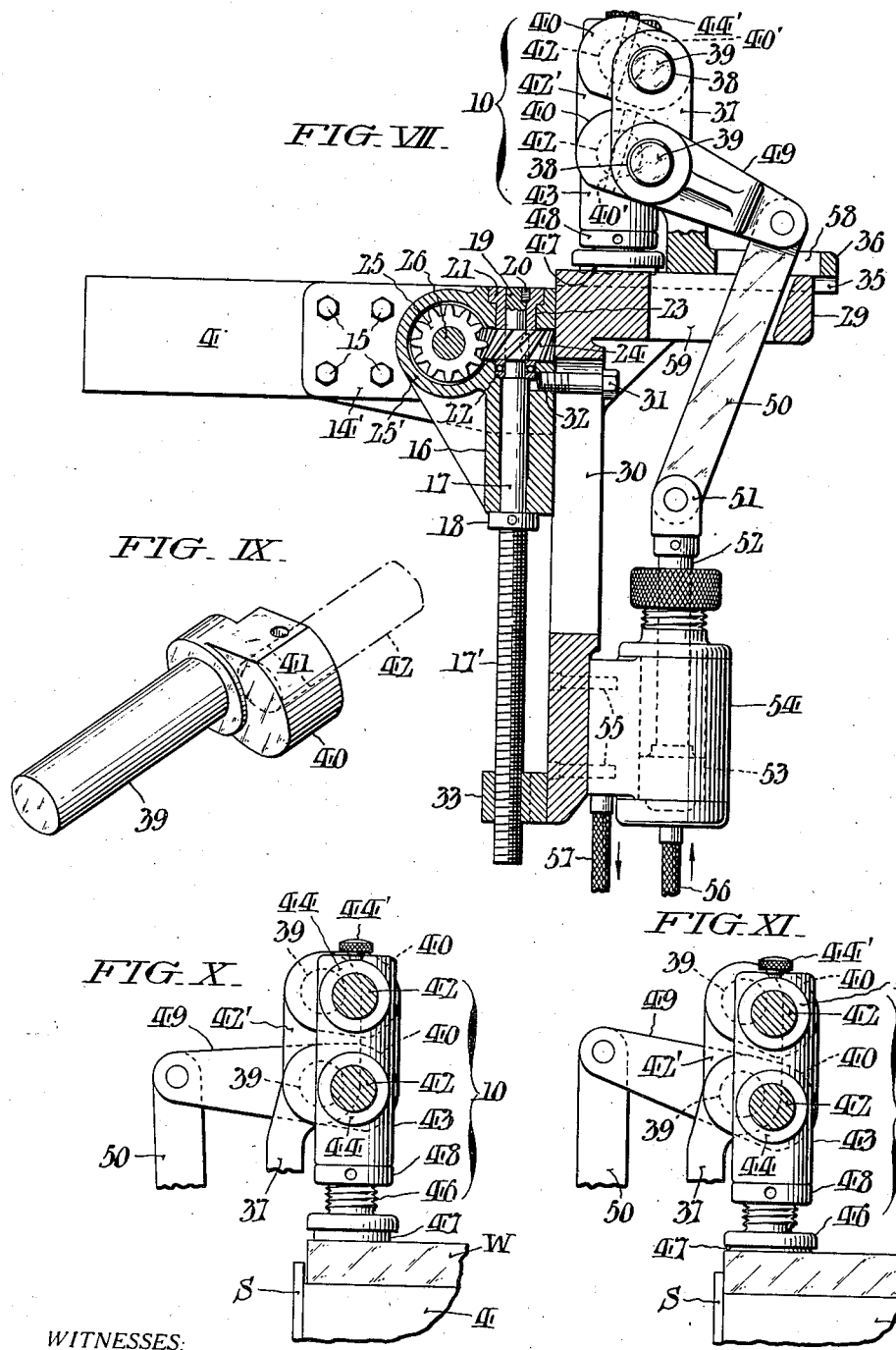
WITNESSES:
Thomas W. Kerr, Jr.
Woodrow Sherman
INVENTOR:
Lloyd G. Wheeler,
BY Paul & Paul
ATTORNEYS.

Patented Nov. 12, 1940

2,221,279

UNITED STATES PATENT OFFICE 2,221,279

MULTIPLE-BORING MACHINE

Lloyd G. Wheeler, York, Pa., assignor to B. M. Root Co., York, Pa., a corporation of Pennsylvania Application December 8, 1938, Serial No. 244,512

7 Claims. (Cl. 144—278)

This invention relates to power actuated boring machines and, more particularly, to horizontal multiple-borers for service in the wood working industries.

Horizontal borers of the multiple-spindle type equipped with power feeds and hold-down clamping means for securing stock in position on the work table are known, but said clamping means, in practice, possesses one serious disadvantage in that it frequently produces indentations in or analogous marring of, the exposed surface of the stock operated on.

The present invention is more especially concerned with the clamping means of such borers and has for its primary object to provide a novel direct-pressure clamping mechanism that is equally effective for securing hard or comparatively soft wood stock on the boring machine table without any liability of disfiguring the same.

Another object is to provide a novel stock clamping means for multiple-borers characterized in that by a slight vertical adjustment said stock is tightly held against a stop projecting slightly above the work-table top, and thereby resisting the pressure of the borer bits in addition to preventing any "slippage" of the work.

A further object is to provide a clamping mechanism including individually adjustable members whereby compensation can be made for any deflection in their common carrying means and thus maintain a fairly uniform clamping pressure on the stock during the boring operation.

A still further object is to provide a clamping means as above indicated in which the clamping pressure can be automatically increased as the boring bit resistance increases, and vice versa.

Other objects and ancillary advantages of the invention will more fully appear from the following disclosure of a typical embodiment thereof, when considered in conjunction with the accompanying drawings.

With the foregoing in view, this invention consists in the novel features of construction and combinations of parts in the embodiment shown and described, and as more particularly defined in the concluding claims.

In the drawings:

Fig. I is a perspective view of a horizontal multiple-boring machine equipped with the novel clamping means of this invention.

Fig. II is a broken larger scale front elevation of the clamping means and associated automatic actuator.

Fig. III is a top plan view of the right-hand portion of the preceding illustration.

Fig. IV is an end elevation of Fig. II, and looking toward the left-hand thereof, is indicated by the arrows IV—IV.

Fig. V is an elevation of Fig. IV, as viewed in the direction of the arrows V—V thereon.

Fig. VI is a sectional elevation on the plane designated VI—VI in Fig. II.

Fig. VII is a view corresponding somewhat to Fig. IV, but illustrating the clamping means withdrawn from coactive relation to the work table, and with parts in section to better illustrate otherwise hidden mechanism.

Fig. VIII is a detail plan section on the plane VIII—VIII of Fig. IV.

Fig. IX is a perspective view of a crank-component hereinafter fully explained.

Fig. X is a detail elevation of one of the clamping devices; and,

Fig. XI is a similar view to the preceding, but showing the parts in a slightly different position incident to the performance of an operative function hereinafter fully explained.

Referring more in detail to the drawings and first to Fig. I, the same depicts a known type of horizontal borer, preferably adapted for operating on wood stock, and comprehensively designated 1. This borer 1 includes a standard 2 with a movable bed 3 reciprocable relative to a vertically adjustable work-table 4, said bed 3 affording laterally-adjustable support for multiple spindle units 5 having boring bits 6; said units being conveniently electrically actuated, and the bed 3 preferably motivated by fluid pressure from an appropriate pump 7 driven by a suitable motor 8, under control of a start-and-stop treadle 9, all in accordance with known practice and merely referred to by way of providing proper background in explaining the present invention.

The present invention, as hereinbefore noted, has reference to novel clamping means, comprehensively designated 10, the same being automatically actuated by fluid pressure diverted from the main pressure line 11 of the machine by a conduit 12, the direction of flow of such pressure being governed by a suitably actuated control device 13 in synchronism with the movements of the bed 3. The clamping means 10, Figs. II–XI, comprises spaced brackets 14, 14' adapted for rigid fixture to the work-table 4 as by fastening means 15. Each bracket 14, 14' embodies a journal section 16 affording rotary support for a vertical shaft 17. As best understood from Figs. VII and VIII, each shaft 17 is screw-threaded at 17' for its major extent, and is fitted with an abutment collar 18 for engagement below the journal section 16, while the upper portion of said shaft 17 is reduced at 19 for rigid fixture, as by a lock screw 20, in a shouldered bearing-sleeve 21 rotatively-sustained by an antifriction thrust bearing 22, in the complemental boring 23 at the upper portion of the journal section 16. Intermediate the ends of each bearing sleeve 21 is a rigidly secured, or integrally-formed spiral gear 24 keyed fast on the shaft reduced extension 19, in mesh with a complemental gear 25 on a transverse shaft 26 journaled between the brackets 14, 14' and having the projecting ends appropriately shaped at 27 for application of a hand-crank 28, Fig. I, or other suitable manipulator; while the gears 24, 25 are enclosed by an appropriate housing portion 25' of the respective brackets 14, 14'.

Abutting each bracket 14, 14' is a vertically-movable angle-member or carrier 29, operative in a guideway 14" at the back of each said bracket, see Fig. VIII, with an elongated slot 30 in its vertical leg, through which a guide or headed stud 31 passes, said stud having its inner end screw-threadedly engaging a radial hole 32 in line with the thrust bearing 22 above referred to. It will be readily understood the stud 31 serves as a guide for said carrier 29, and also enables locking of the carrier at the desired elevation. To operatively coordinate each carrier 29 with the adjacent vertical-shaft screw-threaded portion 17', the latter is fitted with a follower 33, in turn attached to said carrier as by screws 34. Thus it will be apparent that when the transverse shaft 26 is rotated from either end, such rotation will effect concurrent turning movement of the vertical shafts 17, with synchronous progression of the followers 33 and carriers 29 up or down, according to the direction of rotation of said shafts.

Sustained by each carrier 29, as by a conventional dovetail connection 35, is a relatively slidable shoe 36 having an upright portion 37 with vertically spaced holes 38, affording journal bearing for the pin portions 39 of parallel crank-components 40, said components having socket borings 41 for the ends of spaced shafts 42, in turn adjustably carrying the clamping devices 43, which are positioned at the requisite lateral locations by set collars 44 with knurl-screws 44'; and said shafts are taper pinned at 40' to the crank components 40 and operatively coordinated by coupler links 42' near their ends. Each device 43, as best understood from Fig. VI, has the lower end suitably bored and screw-threaded at 45 for reception of a vertically adjustable grip-member 46 having an inset contact piece or disc 47, of leather or other appropriate material, said member 46 being rigidly securable at the necessary adjustment by a lock-nut or collar 48.

For simultaneously actuating the clamping means 10 in synchronism with the movable head 3, one of the crank pin portions 39, conveniently the lower one adjoining the bracket 14', is somewhat extended for application thereto of a fork-ended crank arm 49, in turn coupled by a link 50 to the upper forked end 51, of the piston rod 52, of the clamping means operating piston 53, in the cylinder 54, suitably attached to the carrier 29 as by screws 55, Fig. VII, said cylinder having flexible supply and exhaust lines 56, 57, respectively connected to the main pressure feed-supply conduit 12 and to the conventional storage reservoir (not indicated) in the standard 2. It is to be noted the base of the slidable shoe 36 and the angle carrier 29 are respectively slotted at 58 and 59 for free operating movement of the link 50, Fig. VII, as well as for a purpose later on set forth for clearing the work table 4. Vertically-adjustable stops "s" are provided at the back of the table for engagement by the stock when clamped down by the grips 46.

The operation of the invention is as follows:

As the bed 3 moves forward or towards the stock "w" on the work table 4, a trigger (not visible in the drawings) on the inside of the bed bracket 60, Fig. I, contacts a collar 61, at some predetermined point in the feed stroke to move the piston rod 62 forward until the piston thereof reaches its forward limit within the control device 13, in accordance with known practice. This causes motive fluid, for instance oil under pressure, to flow through the supply line 56 to the lower end of the clamp means operating cylinder 54 and raises the piston 53 therein upwards, which through the link 50, crank arm 49, coupler links 42' and crank components 40, moves the clamping means 10 with its grip members 46 downward and slightly forward due to the eccentric or arcual movement of said crank components 40. By the use of such parallel crank components 40 and spaced shafts 42, the grip members or pads 46 are at all times parallel with the top surface of the work table 4; and thereby clamping pressure is imposed on the stock "w", to be bored by the bit or bits 6. Vertical adjustment of the clamping means 10 to accommodate different thicknesses of stock "w" is accomplished by manipulating the spiral gears 24, 25 and associated parts as hereinbefore explained. The movable bed 3 continues its forward movement until reversed by striking a collar 63, Fig. I, on the valve shifter-rod 64, also in accordance with known practice. As the movement of the bed 3 is reversed by the collar 63 at the predetermined extremity of its feed motion, it returns to its original starting position ready for the succeeding forward stroke. It will, of course, be readily understood the collars 61, 63, and a movement-setting collar 65 on the shifter-rod 64, are all adjustable to permit the operator to control the extent of the feed stroke; relative position of the feed stroke with respect to the work table 4; as well as the point of clamping or unclamping the stock "w" with relation to such feed stroke. By making the collar 61 independently adjustable, the operator is enabled to set the clamping means 10 so that the gripping members 46 operate a moment in advance of engagement of the boring bits 6 with the stock "w" to be bored, and also release the gripping pressure an instant after said bits leave the stock "w" on the return stroke. By means of the arcual movement of the crank components 40, the stock "w" clamped on the work-table 4 will be permitted a slight movement toward or against the adjustable stops "s", thus resisting pressure of the boring bits 6 and effectively preventing outward slipping of the stock "w" while being bored, as readily understandable from Figs. X and XI.

It is also to be remarked that when it is desired to use the work-table 4 for other than normal boring purposes the clamping means 10 may be bodily shifted rearwards by simply releasing a securing screw or screws 66, Figs. II and IV, and manually sliding the shoes 36 from the position of Fig. IV to that of Fig. VII, and then re-tightening said screws, in an apparent manner. Obviously a reversal of the operation just explained will replace the clamping means 10 over the work-table 4 in position for actuation, as before described.

Still further it is to be noted that the pressure developed by the pump 7 is determined by the resistance of the boring bits 6, consequently as such pressure increases as when boring hard woods, fast feeding or when using large size bits 6, said pressure will be transmitted to the clamping means operating cylinder 54, whereby the clamping pressure of the grip members 46 will be automatically increased as the boring bit resistance increases. As stated previously, this is due to the fact the oil which actuates the operating piston 53 of the clamping means 10 is diverted from the main feed supply of the machine 1 and is driven by the same pump 7 that supplies the motive medium (oil) to the main feed cylinder 67, Fig. I, of said machine. It will likewise be understood that as the motive fluid (oil) is fed into the bottom of the clamping means operating cylinder 54, the oil in the top thereof will be forced back through the exhaust line 57 to the machine reservoir; and that when the boring-feed is reversed the direction of flow in the lines 56 and 57 will be also reversed.

From the foregoing the merits and advantages of this invention will be clearly appreciated, while the right is reserved to all modifications or structural changes as are fairly includable in the following claims and the prior art permits.

Having thus described my invention, I claim:

1. In a horizontal wood boring machine having multiple spindles and bits movable in parallelism over the work table, and bearing brackets supported by said table, the combination of spaced carriers slidably attached to the bearing brackets, manually operable mechanism for vertically raising and lowering the carriers, a clamping structure of spaced horizontal shafts and interengaged vertically adjustable clamp devices for applying a substantially uniform pressure on the stock during the boring operation, said structure being pivotally suspended between the spaced carriers, pairs of paralleling cranks operatively coupling the clamping structure to the carriers, mechanism actuable by fluid pressure operatively coordinated with one of said cranks for arcually moving the clamping structure into and out of active position, and a control in connection with the pressure actuated mechanism for automatically increasing and decreasing the pressure exerted by the clamp devices as the resistance to advance of the boring bits increases or decreases.

2. In a horizontal wood boring machine having multiple spindles and bits movable in parallelism over the work table, and bearing brackets attached to said table, the combination of spaced carriers slidably supported by the bearing brackets, and including horizontally movable upper sections, manually operable mechanism for vertically raising and lowering the carriers, a clamping structure of spaced horizontal shafts and interengaging vertically adjustable grip components for applying a substantially uniform pressure on the stock during the boring operation, said structure being fulcrumed between the spaced carrier horizontally movable sections by end paralleling pairs of upper and lower cranks, mechanism actuable by fluid pressure operatively coordinated with one of the lower cranks for positionally holding stock on the work table and sliding it into contact with rigid vertically adjustable stops on said table, and a control associated with the pressure actuated mechanism for automatically increasing and decreasing the pressure exerted by the grip components as the resistance to advance of the boring bits increases or decreases.

3. The combination of claim 2 wherein each spaced carrier is of angle-section and slidably engages the associated bearing bracket on the work table, and said carrier has an elongated slot in the vertical leg with a headed guide pin passed through said slot and secured to the work table bracket.

4. The combination of claim 2 wherein each carrier horizontally movable upper section is attached thereto by a dovetail connection, and means is provided for normally securing such upper section to the carrier over the boring machine work table and permitting its movement therefrom to clear said table.

5. The combination of claim 2 wherein the means for raising and lowering the spaced carriers comprises a follower at the lower end of each said carrier, individual vertical shafts threadedly engage the respective followers, said shafts being supported by rotative sleeves with antifriction bearing in the work table bearing brackets, a spiral gear on each vertical shaft in mesh with a complemental gear on a common operating horizontal shaft journaled through said bearing brackets, and means whereby said horizontal shaft is rotatable to raise or lower the respective carriers in unison.

6. The combination of claim 2 wherein the clamping structure comprises spaced horizontal shafts and interengaged vertical clamp devices, and each said clamp device has an axially adjustable component at the lower end with an inset gripping piece of suitable material.

7. The combination of claim 2 wherein the clamping structure pivotal means comprises upper and lower crank components having socket borings for reception of the ends of said structure horizontal shafts and opposedly directed pin portions coupled together by coactive links, said upper crank pin portions being journaled in the carrier upper sections, and a crank and link connection from one of the lower crank pin portions aforesaid operatively coupled to the piston rod of a fluid pressure actuator, said actuator being supported on the associated vertically slidable carrier.

LLOYD G. WHEELER.